United States Patent
Tanaka et al.

(10) Patent No.: US 12,230,421 B2
(45) Date of Patent: Feb. 18, 2025

(54) HERMETIC TERMINAL

(71) Applicant: SCHOTT Japan Corporation, Koka (JP)

(72) Inventors: Makoto Tanaka, Koka (JP); Hiroshi Kato, Koka (JP); Tetsushi Morikawa, Koka (JP); Akira Okuno, Koka (JP)

(73) Assignee: SCHOTT Japan Corporation, Shiga (JP)

( * ) Notice: Subject to any disclaimer, the term of this patent is extended or adjusted under 35 U.S.C. 154(b) by 557 days.

(21) Appl. No.: 17/612,031

(22) PCT Filed: Jul. 14, 2020

(86) PCT No.: PCT/JP2020/027313
§ 371 (c)(1),
(2) Date: Nov. 17, 2021

(87) PCT Pub. No.: WO2021/015049
PCT Pub. Date: Jan. 28, 2021

(65) Prior Publication Data
US 2022/0230787 A1 Jul. 21, 2022

(30) Foreign Application Priority Data

Jul. 24, 2019 (JP) .................................. 2019-136209
Jun. 22, 2020 (JP) .................................. 2020-106768

(51) Int. Cl.
*H01B 17/30* (2006.01)
*C03C 21/00* (2006.01)
(Continued)

(52) U.S. Cl.
CPC ......... *H01B 17/305* (2013.01); *C03C 21/008* (2013.01); *C03C 29/00* (2013.01);
(Continued)

(58) Field of Classification Search
CPC .................................................... H01B 17/305
See application file for complete search history.

(56) References Cited

U.S. PATENT DOCUMENTS 4,103,416 A * 8/1978 Sakamoto ............ H01B 17/305
65/59.1
4,493,378 A 1/1985 Kyle
(Continued)

FOREIGN PATENT DOCUMENTS

CN 103298762 A 9/2013
GB 1 562 092 3/1980
(Continued)

OTHER PUBLICATIONS

English Translation of JP6220267 obtained form EPO espacenet on Apr. 20, 2024. (Year: 2024).*
English translation of the International Search Report of the International Searching Authority for International Application PCT/JP2020/027313, mailed Sep. 8, 2020, 2 pages, Japan Patent Office, Tokyo, Japan.
(Continued)

*Primary Examiner* — Adam Krupicka
(74) *Attorney, Agent, or Firm* — Keating & Bennett, LLP

(57) ABSTRACT

A hermetic terminal includes a metal outer ring made of a low resistance conductor having a through hole, a lead made of a low resistance conductor inserted in the through hole of the metal outer ring, and an insulating material made of high expansion glass for sealing the metal outer ring and the lead.

15 Claims, 2 Drawing Sheets

(51) Int. Cl.
- *C03C 29/00* (2006.01)
- *H01B 1/02* (2006.01)
- *H01B 17/56* (2006.01)
- *H01R 13/52* (2006.01)

(52) U.S. Cl.
CPC ............. *H01B 1/026* (2013.01); *H01B 17/56* (2013.01); *H01R 13/5216* (2013.01)

(56) References Cited

U.S. PATENT DOCUMENTS

| | | | |
|---|---|---|---|
| 4,580,003 A | | 4/1986 | Bowsky et al. |
| 7,206,186 B1 * | | 4/2007 | Knight .................. H01G 9/145 |
| | | | 361/519 |
| 2013/0330603 A1 | | 12/2013 | Kroll et al. |

FOREIGN PATENT DOCUMENTS

| | | | |
|---|---|---|---|
| JP | 52-093993 A | 8/1977 | |
| JP | 57-041791 B2 | 9/1982 | |
| JP | 61-260560 A | 11/1986 | |
| JP | 62-020267 A | 1/1987 | |
| JP | 62-040182 A | 2/1987 | |
| JP | 09-265963 A | 10/1997 | |
| JP | 10-50503 A | 2/1998 | |
| JP | 10-284305 A | 10/1998 | |
| JP | 11-16418 A | 1/1999 | |
| JP | 2004-273358 A | 9/2004 | |
| JP | 2018-181721 A | 11/2018 | |

OTHER PUBLICATIONS

English Translation of PCT Written Opinion of the International Searching Authority for International Application PCT/JP2020/027313, mailed Sep. 8, 2020, 3 pages.

Receipt No. 21901550091 dated Aug. 23, 2019 from Japan Patent Office, acknowledging submission of Certificate for the Application of Exceptions to Loss of Novelty in Japanese Patent Application 2019-136209, 1 page; with English translation, 1 page.

Document to be Submitted for Certificate for the Application of Exceptions to Loss of Novelty, dated Aug. 22, 2019, in Japanese Patent Application 2019-136209, 1 page; with English translation, 1 page.

Certificate for the Application of Article 30 of the Patent Act, dated Aug. 22, 2019, submitted in Japanese Patent Application 2019-136209, relating to publication "Development of Electronic and Electric Components for EVs and HEVs and Recent Cases Thereof", 2 pages; with English translation, 1 page.

Makoto Tanaka, Development of Electronic and Electric Components for EVs and HEVs and Recent Cases Thereof, Chapter 2, Section 1, "Development of GTMS Hermetic Package Intended for SiC Power Devices and Capable of Handling High Heat Dissipation and Large Current", pp. 45 to 49, Technical Information Institute Co., Ltd., Nov. 30, 2018; with English translation, 8 pages.

Official Communication issued in corresponding Japanese Patent Application No. 2020-106768, mailed on Dec. 5, 2022.

Ikeda, "Mechanism of Sealing of Glass and Metal", Journal of the Ceramic Association, vol. 72, No. 818, Feb. 1, 1964, pp. 51-59.

Official Communication issued in corresponding Chinese Patent Application No. 202080037165.X, mailed on Nov. 2, 2022.

* cited by examiner

HERMETIC TERMINAL

TECHNICAL FIELD

The present disclosure relates to a hermetic terminal.

BACKGROUND ART

A hermetic terminal is a terminal in which a lead is hermetically sealed in an insertion hole of a metal outer ring with an insulating material being interposed therebetween, as described in Japanese Patent Laying-Open No. 61-260560. The hermetic terminal is used when a current is supplied to an electrical device or element housed inside a hermetic container, or when a signal is derived from the electrical device or element to the outside.

GTMS (Glass-to-Metal-Seal) type hermetic terminals, in each of which a metal outer ring and a lead are sealed with insulating glass, are roughly classified into the following two types: a matched sealing type hermetic terminal; and a compression sealing type hermetic terminal. In order to secure highly reliable hermetic sealing in the hermetic terminal, it is important to select appropriate metal materials constituting the metal outer ring and the lead as well as appropriate insulating glass such that these materials have appropriate thermal expansion coefficients.

The insulating glass for sealing is determined according to materials, required temperature profiles, and thermal expansion coefficients of the metal outer ring and the lead. In the case of matched sealing, the metal materials and the insulating glass are selected such that these materials have thermal expansion coefficients that match with one another as much as possible. On the other hand, in the case of compression sealing, metal materials and insulating glass having different thermal expansion coefficients are intentionally selected such that the metal outer ring compresses the insulating glass and the lead.

In order to secure high hermetic reliability and electrical insulation property, in the matched sealing type hermetic terminal, a Kovar alloy (Fe: 54%, Ni: 28%, Co: 18%) having a thermal expansion coefficient that matches that of a glass material in a wide temperature range is used as a material for the metal outer ring and the lead, and the metal outer ring and the lead are sealed with insulating glass made of borosilicate glass. In the compression sealing type hermetic terminal, in order to apply a concentric compressive stress to the glass in a use temperature range, a metal outer ring made of steel such as carbon steel or stainless steel, and a lead made of an iron alloy such as an iron nickel alloy (Fe: 50%, Ni: 50%) or an iron chromium alloy (Fe: 72%, Cr: 28%) are used, and the metal outer ring and the lead are sealed with insulating glass made of soda barium glass.

CITATION LIST

Patent Literature

PTL 1: Japanese Patent Laying-Open No. 61-260560

SUMMARY OF INVENTION

Technical Problem

Along with recent progress particularly in electrification of cars and speeding-up of trains, development of power devices using SiC elements for high output applications is active. There has been no package that can handle all of a high heat dissipation, a large current, and a high hermeticity, and it has been impossible to make full use of these characteristics. On the other hand, it is favorable if a lead having a relatively large wire diameter made of a low resistance conductor such as copper or aluminum can be used to increase the current capacity of a hermetic terminal.

However, these low resistance conductors have high thermal expansion rates. If the lead made of a low resistance conductor is sealed with insulating glass made of borosilicate glass or soda lime glass having a low thermal expansion rate, a tensile stress is produced in a circumferential direction of the insulating glass in contact with the lead as the lead made of a low resistance conductor expands and contracts. As a result, an interface between the lead and the insulating glass is detached, or a crack penetrating through the insulating glass occurs in an axial direction of the lead, thereby causing leakage. Thus, defective sealing is likely to be caused.

An object of the present disclosure is to provide a hermetic terminal that can handle all of a high heat dissipation, a large current, and a high hermeticity, and uses low resistance metals for a metal outer ring and a lead.

Solution to Problem

According to the present disclosure, provided is a hermetic terminal including a metal outer ring made of a low resistance conductor composed of copper or a copper alloy having a through hole, a lead made of a low resistance conductor inserted in the through hole, and an insulating material made of high expansion glass arranged in the through hole for sealing the metal outer ring and the lead.

The low resistance conductors may be made of copper or a copper alloy.

The insulating material may have diffusion zones in which low resistance conductor ions are diffused in glass of transition regions in contact with interfaces between the low resistance conductors and the insulating material. The diffusion zones increase adhesiveness of the high expansion glass with respect to surfaces of the low resistance conductors such as copper or a copper alloy, and improve interface strength.

The diffusion zones may exhibit a light pink to deep red color.

The low resistance conductor ions diffused in the diffusion zones may be copper ions. The copper ions may be cuprous ions.

As the high expansion glass constituting the insulating material, glass having a thermal expansion coefficient in a range of 17±6 ppm/K may be used. In this case, the thermal expansion coefficient matches a thermal expansion coefficient of copper of 17 ppm/K.

As the insulating material, phosphoric acid-based glass may be used.

As the insulating material, a glass material which can be sealed at a sealing temperature of less than 900° C. may be used. Since copper has a melting point that is lower than that of a steel material, if glass is sealed to copper at a high temperature of 900° C. or more, crystal grains are enlarged, and copper may enter a so-called annealed state and may have a reduced mechanical strength. It is desirable to seal the glass at a low temperature of less than 900° C. as much as possible.

Plating may be provided on exposed surfaces of the metal outer ring and the lead. The plating may be at least one selected from nickel plating, nickel phosphorus plating, nickel boron plating, and gold plating.

DESCRIPTION OF EMBODIMENTS

Figure 1A:
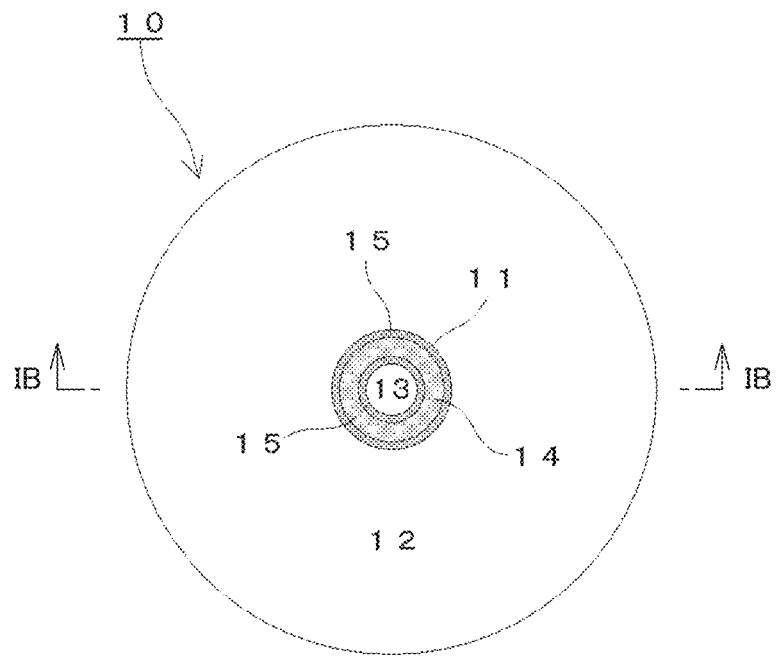
FIG. 1A is a plan view showing a hermetic terminal in accordance with the present disclosure.
Figure 1B:
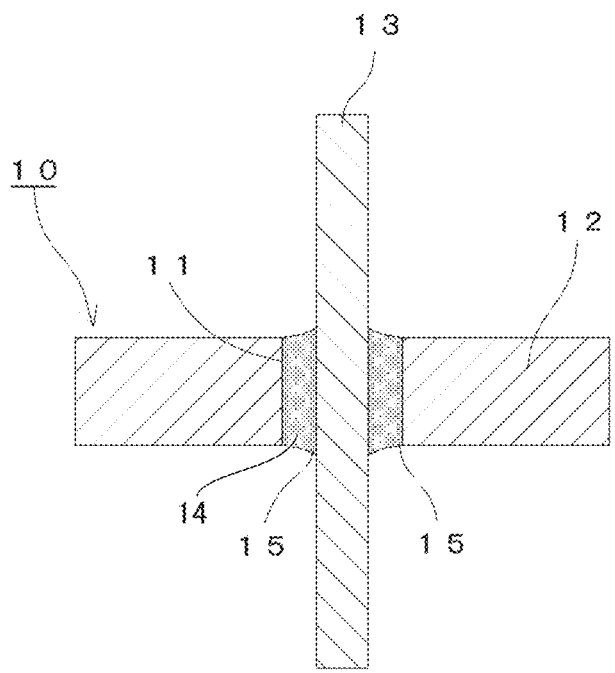
FIG. 1B is a front cross sectional view showing the hermetic terminal in accordance with the present disclosure, taken along a line IB-IB in FIG. 1A.

As shown in FIGS. 1A and 1B, a hermetic terminal 10 in accordance with the present disclosure includes a metal outer ring 12 made of a low resistance conductor such as copper or a copper alloy having at least one through hole 11, at least one lead 13 made of a low resistance conductor such as copper or a copper alloy inserted in through hole 11, and an insulating material 14 made of high expansion glass arranged in through hole 11 for sealing metal outer ring 12 and lead 13.

Since insulating material 14 is made of high expansion glass (glass having a high thermal expansion rate), the thermal expansion rate of insulating material 14 easily matches thermal expansion rates of metal outer ring 12 and lead 13 each made of a low resistance conductor composed of a high thermal expansion material (a material having a high thermal expansion coefficient) such as aluminum or copper, and defective sealing caused due to a difference in thermal expansion rate can be reduced.

Insulating material 14 has diffusion zones 15 in which ions of copper as a low resistance conductor constituting lead 13 and the like are diffused in glass of transition regions in contact with interfaces with metal outer ring 12 and lead 13. Diffusion zones 15 increase adhesiveness of the high expansion glass with respect to surfaces of the low resistance conductors such as copper or a copper alloy, and improve interface strength.

As the high expansion glass, glass having a thermal expansion coefficient in a range of 17±6 ppm/K can be used. For example, phosphoric acid-based glass can be suitably used, because its thermal expansion coefficient matches a thermal expansion coefficient of copper of 17 ppm/K.

Since copper has a melting point that is relatively lower than those of iron and a steel material, if glass is sealed to copper at a high temperature of 900° C. or more, crystal grains are enlarged, and copper may enter a so-called annealed state and may have a reduced mechanical strength. It is desirable to seal the glass at a low temperature of less than 900° C. as much as possible. Therefore, it is preferable to select a glass material which can be sealed at a sealing temperature of less than 900° C., as insulating material 14.

Plating may be provided on exposed surfaces (surfaces not covered with insulating material 14) of metal outer ring 12 and lead 13. The plating may be at least one selected from nickel plating, nickel phosphorus plating, nickel boron plating, and gold plating. When metal outer ring 12 and lead 13 are made of copper, for example, copper surfaces are subjected to natural oxidation in the air, which may cause deterioration of electrical conductivity (increase in contact resistance) and deterioration of solderability. Oxidation can be prevented by sealing the lead and the metal outer ring made of copper with the insulating material, and then providing plating on the exposed surfaces of the lead and the metal outer ring.

Example

A hermetic terminal in Example 1 in accordance with the present disclosure is a matched sealing type hermetic terminal, and includes a metal outer ring made of copper having three through holes, three leads made of copper respectively inserted in the through holes of the metal outer ring, and an insulating material made of high expansion glass having a thermal expansion coefficient of 15.9 ppm/K composed of phosphoric acid-based glass for sealing the metal outer ring and each lead.

Figure 2A:
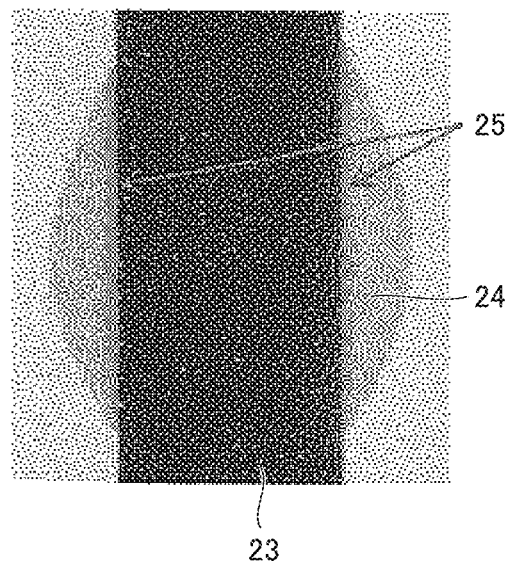
FIG. 2A is a cross sectional photograph showing a diffusion zone formed in glass of a transition region in contact with an interface between a lead and an insulating material.

The insulating material has diffusion zones in which copper ions are diffused in glass of transition regions in contact with interfaces with the metal outer ring and each lead. FIG. 2A is a cross sectional photograph showing a diffusion zone formed in glass of a transition region in contact with an interface between a lead and the insulating material, and FIG. 2B is a cross sectional view showing the diffusion zone formed in the glass of the transition region in contact with the interface between the lead and the insulating material shown in FIG. 2A.

Figure 2B:
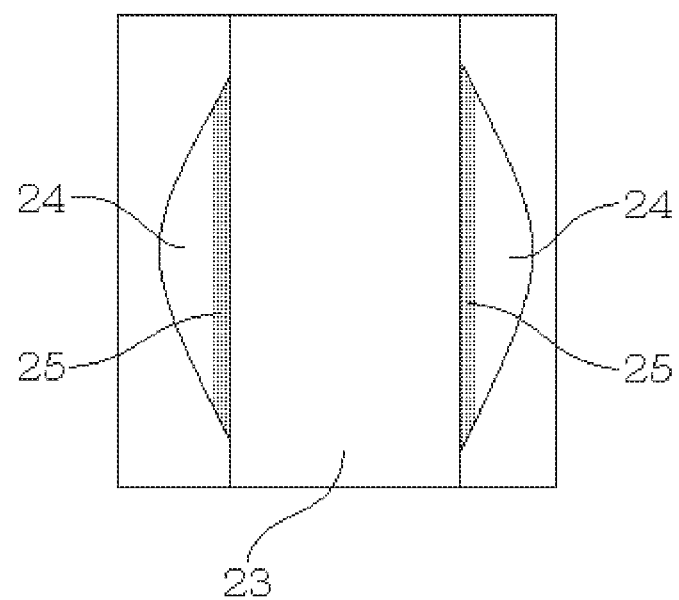
FIG. 2B is a cross sectional view showing the diffusion zone formed in the glass of the transition region in contact with the interface between the lead and the insulating material shown in FIG. 2A.

As shown in FIGS. 2A and 2B, in an insulating material 24 made of a glass material, a diffusion zone 25 is formed in the transition region in contact with the interface between a lead 23 made of copper and insulating material 24. Diffusion zone 25 is made of a diffusing object derived from cuprous ions. Diffusion zone 25 exhibits a light pink to red or deep red (ruby) color. It should be noted that, when cupric ions are diffused in the glass, diffusion zone 25 exhibits a blue to green color.

Pure copper (metal copper) has a poor wettability with respect to glass, and it is difficult to stably seal a lead and a metal outer ring having pure copper surfaces with common glass. Even though they apparently seem to be sealed, they lack mechanical durability, and the interfaces sealed with the glass are likely to be detached. Accordingly, it has been difficult to maintain hermeticity.

On the other hand, wettability with respect to the glass is improved by providing an oxide film on a copper surface. However, a copper oxide (both cuprous and cupric oxides) has a weak mechanical strength and also has a poor hermeticity. Accordingly, when a thick copper oxide film exists on a metal surface as an example, an interface with the glass is likely to be detached. Even when the interface is not detached, the copper oxide film itself has a low hermeticity, which results in a terminal having a poor hermeticity.

The hermetic terminal of the present embodiment has, on a copper surface, a very thin oxide layer (a unimolecular oxide layer or an oxide layer similar thereto) and a diffusion zone in which copper ions are diffused in glass. This can avoid reduction in mechanical strength and hermeticity that may occur when the thick copper oxide film is provided thereon. At the same time, since the diffusion zone in which copper ions are diffused in the glass is more excellent in wettability with respect to copper than glass in which copper ions are not diffused, a high hermeticity can be maintained at the interfaces with the metal outer ring and the lead made of copper. Further, since the thin oxide layer is provided on the copper surface, wettability of the glass with respect to copper can further be improved.

Preferably, a cuprous oxide is used as a copper oxide and copper ions. Adhesiveness of the glass with respect to copper is particularly improved by diffusing a cuprous oxide as copper ions. Since a cupric oxide is inferior to a cuprous oxide in adhesiveness with respect to the glass, it is not preferable to form a diffusion zone by diffusing cupric ions only. However, a certain degree of effect is obtained also when a cupric oxide is partially included in copper ions mainly composed of a cuprous oxide (when a cuprous oxide accounts for more than half).

When insulating material 24 made of a glass material adheres to lead 23 made of copper as in FIGS. 2A and 2B, a joining strength at the interface between lead 23 and insulating material 24 is improved by forming diffusion zone 25 in insulating material 24 along lead 23. Thereby, even when lead 23 is formed of a low resistance conductor such as copper, sufficient adhesiveness and wettability between lead 23 and insulating material 24 are obtained, and hermeticity can be secured.

When lead 13 made of copper and metal outer ring 12 made of copper are sealed with insulating material 14 made of a glass material, diffusion zones 15 are formed in a transition region in contact with an interface between metal outer ring 12 and insulating material 14, and in a transition region in contact with an interface between lead 13 made of copper and insulating material 14. Thereby, a joining strength at the interface between metal outer ring 12 and insulating material 14 and a joining strength at the interface between lead 13 and insulating material 14 can be improved. As a result, even when metal outer ring 12 and lead 13 are made of low resistance conductors such as copper, sufficient adhesiveness between insulating material 14 and each of metal outer ring 12 and lead 13 is obtained, and hermeticity can be secured.

In Example 1, after sealing, desired finishing plating such as nickel plating, nickel phosphorus plating, nickel boron plating, or gold plating may further be provided on exposed surfaces of the metal outer ring and the lead. The insulating material may be any high expansion glass having a thermal expansion coefficient that matches the thermal expansion coefficient of copper of 17 ppm/K.

Since the phosphoric acid-based glass has a sealing temperature of 600° C., which is less than 900° C., it does not deteriorate copper constituting the metal outer ring and the lead during sealing. Instead of the phosphoric acid-based glass, any other glass material may be used.

INDUSTRIAL APPLICABILITY

The present disclosure is particularly applicable to a hermetic terminal which endures a high voltage and a high current, and which is required to have a high hermeticity.

REFERENCE SIGNS LIST

10: hermetic terminal; 11: through hole; 12: metal outer ring; 13, 23: lead; 14, 24: insulating material; 15, 25: diffusion zone.

The invention claimed is:

1. A hermetic terminal comprising:
a metal outer ring made of a low resistance conductor having a through hole;
a lead made of a low resistance conductor inserted in the through hole; and
an insulating material made of high expansion glass arranged in the through hole for sealing the metal outer ring and the lead; wherein
the insulating material has diffusion zones in which low resistance conductor ions are diffused in glass of transition regions in contact with interfaces with the metal outer ring and the lead.

2. The hermetic terminal according to claim 1, wherein the low resistance conductor is made of copper or a copper alloy.

3. The hermetic terminal according to claim 1, wherein the diffusion zones exhibit a light pink to deep red color.

4. The hermetic terminal according to claim 1, wherein the low resistance conductor ions diffused in the diffusion zones are copper ions.

5. The hermetic terminal according to claim 4, wherein the copper ions are cuprous ions.

6. The hermetic terminal according to claim 1, wherein the insulating material has a thermal expansion coefficient in a range of 17±6 ppm/K.

7. The hermetic terminal according to claim 1, wherein the insulating material is made of phosphoric acid-based glass.

8. The hermetic terminal according to claim 1, wherein the insulating material is a material which can be sealed at a sealing temperature of less than 900° C.

9. The hermetic terminal according to claim 1, wherein a plating is provided on exposed surfaces of the metal outer ring and the lead.

10. The hermetic terminal according to claim 9, wherein the plating is at least one selected from nickel plating, nickel phosphorus plating, nickel boron plating, and gold plating.

11. A hermetic terminal comprising:
a metal outer ring made of a low resistance conductor having a through hole;
a lead made of a low resistance conductor inserted in the through hole; and
an insulating material made of high expansion glass arranged in the through hole for sealing the metal outer ring and the lead; wherein
the insulating material is made of phosphoric acid-based glass.

12. The hermetic terminal according to claim 11, wherein the insulating material has a thermal expansion coefficient in a range of 17±6 ppm/K.

13. The hermetic terminal according to claim 11, wherein the insulating material is a material which can be sealed at a sealing temperature of less than 900° C.

14. The hermetic terminal according to claim 11, wherein a plating is provided on exposed surfaces of the metal outer ring and the lead.

15. The hermetic terminal according to claim 14, wherein the plating is at least one selected from nickel plating, nickel phosphorus plating, nickel boron plating, and gold plating.

* * * * *